Dec. 24, 1957 W. MANDLER 2,817,270
TELESCOPE OBJECTIVE SYSTEMS
Filed Dec. 12, 1955

INVENTOR
WALTER MANDLER

United States Patent Office 2,817,270
Patented Dec. 24, 1957

2,817,270

TELESCOPE OBJECTIVE SYSTEMS

Walter Mandler, Midland, Ontario, Canada, assignor to Ernst Leitz G. m. b. H., Wetzlar, Germany Application December 12, 1955, Serial No. 552,512

4 Claims. (Cl. 88—57)

This invention relates to improvements in objectives for use in telescopes of the type providing a magnification of the order of 50X and intended primarily for use in amateur astronomy or in surveying. In designing such a telescope the following properties were considered as being desirable:

(1) A single unbroken optic axis.
(2) Upright images.
(3) Short overall length of instrument.
(4) Good optical correction especially with respect to the secondary spectrum.
(5) Small f/ number.
(6) Rugged construction.
(7) Few elements, all with spherical surfaces.

The combination of any well-known eyepiece with an objective of the Gregorian type provides for the first three properties. In the Gregorian objective, a concave main reflector with a central aperture acts in conjunction with a smaller secondary concave reflector placed outside the focus of the main reflector, this secondary reflector serving to reflect the light rays back through the central aperture. An eyepiece is then used to examine the image formed behind the main reflector. In its original form, the Gregorian objective utilized as the main reflector, part of a paraboloid of revolution, and as the secondary reflector, part of an ellipsoid of revolution. The paraboloid focused parallel axial rays at its focus which coincided with one focus of the ellipsoid, the image finally being formed at the second focus of this ellipsoid. These quadric surfaces were used because of their characteristic focal properties and because spherical mirrors inherently have spherical aberration. The difficulty in making aspheric surfaces, combined with the restricted field of view obtained with them, caused development of spherical correctors to compensate for the aberration of spherical mirrors. Of course, this introduced chromatic aberrations which with the mirror alone, were absent. The object of the present invention is to design a Gregorian telescope objective utilizing only spherical surfaces and having good correction for chromatic and spherical aberration as well as for coma.

A further object of the present invention is to provide an objective which has durable reflecting surfaces and which allows making a rugged, sealed instrument.

The use of Mangin mirrors as primary and secondary reflectors suited the achievement of both objects. The term Mangin mirror is well known in the art as referring to a combination of a positive spherical reflector with a negative refracting element having spherical surfaces, the combination having an overall positive power. In practice the reflector coincides with one surface of the refracting element, this surface being coated with silver or aluminum. This reflecting surface is protected by the refracting element and can also be protected at its rear surface, by applying an outer layer in a manner well-known in the art. As well, the radii of curvature of the surfaces, and the glass type and thickness of the refracting element provide variables for correction of aberrations. Finally, the Mangin mirror being an integration of two elements, simplifies the system and allows it to be made rugged. To provide the necessary aperture in the main reflector, the central portion of the rear surface of the reflector is left uncoated. The rays reflected by the secondary Mangin mirror pass through the central part of the main Mangin mirror so that this central uncoated portion has a negative lens effect on the rays.

The invention provides for a single positive lens placed in front of the main reflector and which has focal length approximately equal to the focal length of the whole system. As well as being a refracting element the positive lens serves to seal the barrel containing the main reflector and therefore prevents dust entering the telescope. In addition it provides support for the secondary reflecting mirror so that the use of a spider, which would block off part of the light, is obviated.

In drawings which illustrate a particular embodiment of the invention,

Figure 1:
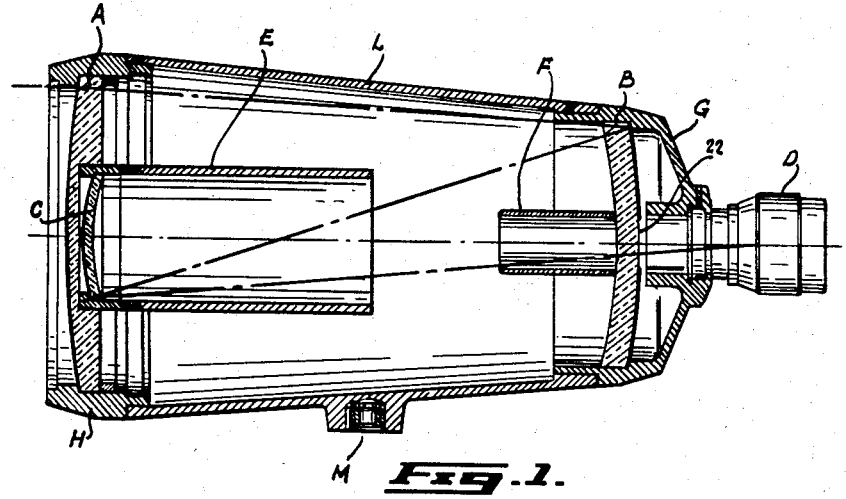
Figure 1 is a side sectional elevation of a telescope.

The telescope shown in Figure 1 uses the present invention in conjunction with a standard eyepiece D. A positive lens A and a secondary Mangin mirror C are supported in a mounting H threaded on to a barrel L. A main Mangin mirror B is mounted in a portion G which is threaded onto the barrel L so that slight adjustment in the distance between the elements A and B can be made. This focusing adjustment is supplementary to the normal focusing arrangement of eyepiece D which also is secured by the portion G. The eyepiece D is aligned on the same optical axis as the three elements A, B and C, and is directly behind an aperture 22 in the coated rear surface of the element B. Two tubes E and F prevent light from passing directly from the positive lens A into the central aperture 22 of the element B. To simplify the drawing, the details of the supports for the tubes E and F have been omitted. The telescope, being very compact, is suitable for mounting on the light type of tripod used with cameras, and for this purpose a tripod socket M is provided in the barrel L.

Figure 2:
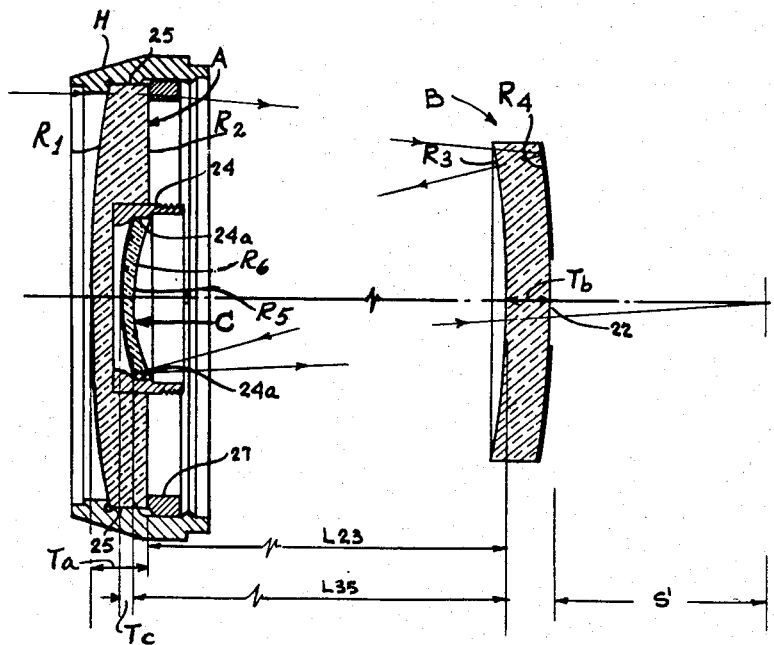
Figure 2 is a side sectional elevation of the objective elements of this telescope.

Referring now to Figure 2 the elements of the objective are shown somewhat enlarged and with their common optic axis compressed.

To obtain the desired corrections for the system it was found necessary to make the three elements all of crown glass and to have their V values differ by not more than 7 and, as well, to give the positive lens, element A, a focal length substantially equal to the focal length of the whole objective. The V value is the reciprocal of the dispersive power W;

$$V = \frac{1}{W} = \frac{Nd-1}{Nc-Nf}$$

where $Nc$, $Nd$ and $Nf$ are the indices of refraction for the sodium C, D and F lines respectively.

Element A is a plano-convex lens with a mounting 24 fixed at its center on the rear surface 2 which faces the main reflector element B. The mounting 24 supports the secondary Mangin mirror C and causes it to be aligned with the optic axis of the system.

The secondary Mangin mirror, element C, has a reflecting (e. g. aluminized) rear surface $R_6$, while the main Mangin mirror, element B has a reflecting surface $R_4$ with a central aperture 22. The axial distance between the surfaces $R_2$ and $R_3$ is shown as L23, the axial distance between surfaces $R_3$ and $R_5$ is shown as L35, and the distance from surface R to the position of the image is designated as S′.

The following table gives a typical set of values for an objective according to the present invention. The values are relative and any appropriate set of units may be used:

| Element | $Nd$ | $V=\frac{1}{W}$ | Axial Thickness | Radius of Curvature |
|---|---|---|---|---|
| A | 1.5182 | 59.0 | $t_a=1.7$ | $R_1=48.38$ $R_2=\infty$ |
| B | 1.5163 | 64.0 | $t_b=1.4$ | $R_3=22.21$ $R_4=35.16$ |
| C | 1.5182 | 65.2 | $t_c=0.46$ | $R_5=10.61$ $R_6=7.78$ |

$l_{23}=23.6 \quad l_{34}=24.0$

The above values give an objective with a focal length equal to 100, S′ equals to 5.4, the $f/$ value is 9 and the angle of view is 1.35°.

A telescope utilizing the present invention will have a barrel length approximately equal to one-third of the objective focal length. Inherent in the objective is a curvature of field which is opposite to that found in most eyepieces so that the resultant image field is relatively flat. In addition to these characteristics the telescope is rugged, and has all spherical surfaces none of which are pierced. The result is a telescope which is well corrected, sturdy and economical to produce.

I claim:

1. A Gregorian type telescope objective consisting of; a main mirror of positive power and consisting of a negative lens having spherical surfaces and a reflective back coating on the convex side thereof, said back coating being centrally apertured; a secondary mirror of positive power and consisting of a negative lens having spherical surfaces and a reflective back coating on the convex side thereof; said secondary mirror being mounted to reflect light rays from the main mirror back through said aperture; and a positive lens the focal length of which is substantially equal to the focal length of the whole objective, said mirrors and lens having a common straight optic axis and the refracting material of said lens and mirrors having V values which differ one from another by not more than 7, said positive lens being positioned so as to refract incident light rays before they strike the main mirror, and said secondary mirror being positioned between said main mirror and said lens.

2. An objective as claimed in claim 1, wherein said secondary mirror is mounted on said lens.

3. An objective as claimed in claim 2 wherein the distance between said main mirror and said lens is adjustable to allow for focussing.

4. An objective as claimed in claim 2 wherein the variables as hereinbefore defined have the following values:

| Element | $Nd$ | $V=\frac{1}{W}$ | Axial Thickness | Radius of Curvature |
|---|---|---|---|---|
| A | 1.5182 | 59.0 | $t_a=1.7$ | $R_1=48.38$ $R_2=\infty$ |
| B | 1.5163 | 64.0 | $t_b=1.4$ | $R_3=22.21$ $R_4=35.16$ |
| C | 1.5182 | 65.2 | $t_c=0.46$ | $R_5=10.61$ $R_6=7.78$ |

$l_{23}=23.6 \quad l_{34}=24.0$ where
A is said positive lens.
B is said main Mangin mirror.
C is said secondary Mangin mirror.
$Nd$ is the index of refraction for the sodium $d$ line.
V = the reciprocal of dispersive power.
W = dispersive power.
$t_a$, $t_b$ and $t_c$ are the axial thicknesses of elements A, B and C.
$R_1$ = radius of curvature of the surface of element A closest to object.
$R_2$ = radius of curvature of the inner surface of lens A.
$R_3$ and $R_4$ = radii of curvature of the concave and convex surfaces of element B respectively.
$R_5$ and $R_6$ = radii of curvature of the concave and convex surfaces of element C respectively.

References Cited in the file of this patent

UNITED STATES PATENTS

| | | |
|---|---|---|
| 620,978 | Schupmann | Mar. 14, 1899 |
| 1,578,899 | Lohmann | Mar. 30, 1926 |
| 1,665,660 | Foster | Apr. 10, 1928 |
| 2,413,286 | Buchele | Dec. 31, 1946 |
| 2,504,383 | Bouwers et al. | Apr. 18, 1950 |
| 2,685,820 | Kaprelian | Aug. 10, 1954 |

FOREIGN PATENTS

| | | |
|---|---|---|
| 3,295 | Great Britain | of 1810 |
| 82,671 | Germany | Aug. 7, 1895 |
| 724,026 | Germany | Aug. 15, 1942 |
| 969,797 | France | May 31, 1950 |